H. N. FAAS.
CLUTCH.
APPLICATION FILED FEB. 27, 1914.
1,114,683.
Patented Oct. 20, 1914.
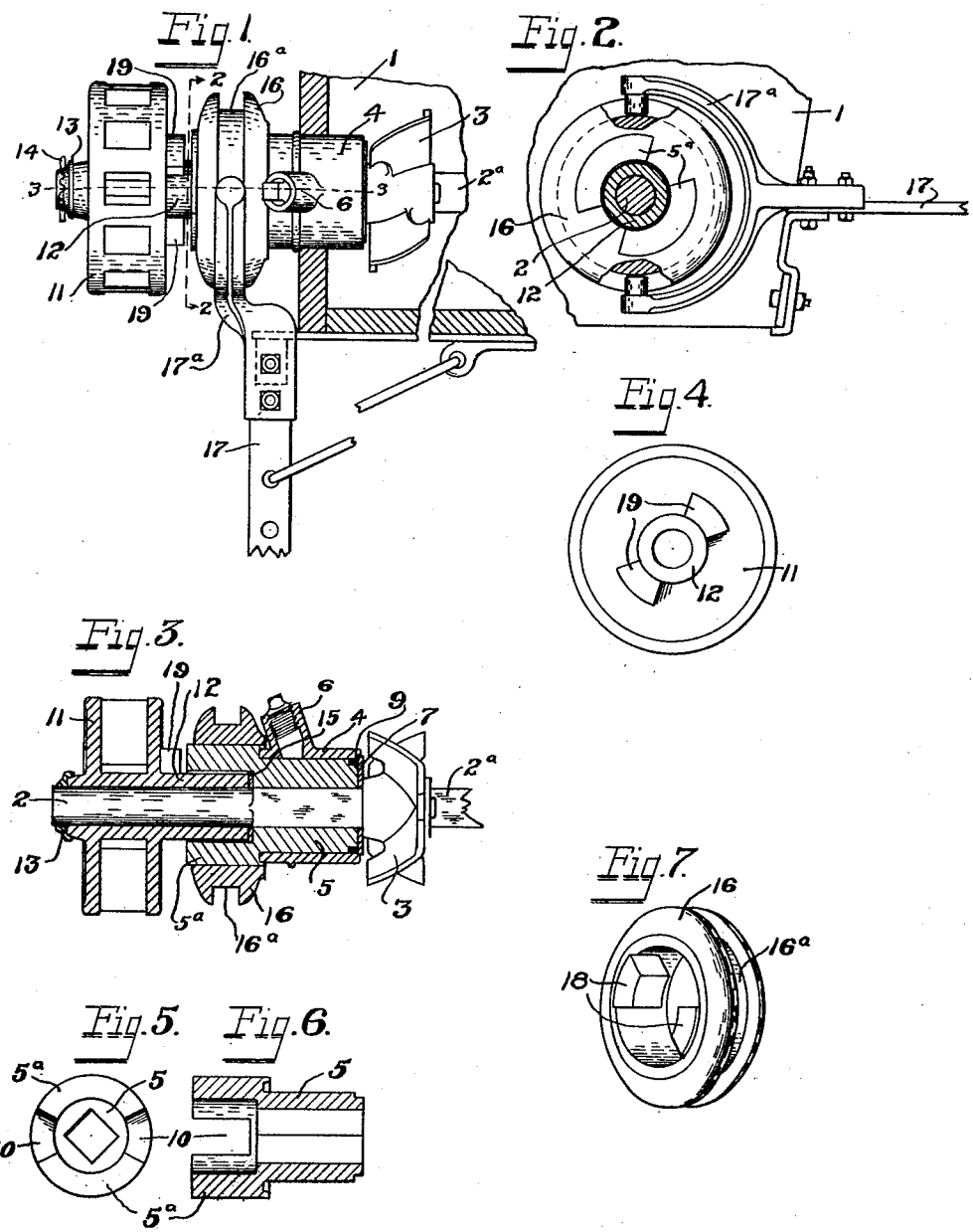

UNITED STATES PATENT OFFICE.

HENRY N. FAAS, OF SPRINGFIELD, OHIO, ASSIGNOR TO THE AMERICAN SEEDING MACHINE COMPANY, OF SPRINGFIELD, OHIO, A CORPORATION OF OHIO.

CLUTCH.

1,114,683.  Specification of Letters Patent.  Patented Oct. 20, 1914.

Application filed February 27, 1914. Serial No. 821,395.

*To all whom it may concern:*

Be it known that I, HENRY N. FAAS, a citizen of the United States, residing at Springfield, in the county of Clark and State of Ohio, have invented certain new and useful Improvements in Clutches, of which the following is a specification.

This invention relates to improvements in clutches, the clutch being one more particularly adapted for fertilizer distributing machines for forming a driving connection between the carrying wheel and the agitator shaft.

The object of the invention is to provide a clutch which will be simple in construction and effective in operation.

In the accompanying drawings, Figure 1 is a top plan view of a clutch embodying the improvements, showing a portion of the hopper of a fertilizer distributer in transverse section and also the hub of one of the carrying wheels, the clutch being shown in disengaged position. Fig. 2 is a section on the line 2—2 of Fig. 1. Fig. 3 is a section on the line 3—3 of Fig. 1. Fig. 4 is an end view of the hub of one of the carrying wheels. Fig. 5 is an end view of one of the clutch members. Fig. 6 is a longitudinal section of the same. Fig. 7 is a perspective view of the shiftable clutch member.

Like parts are represented by similar characters of reference throughout the several views.

In the said drawings, 1 represents a portion of the hopper of a fertilizing distributing machine, this machine being in the present case what is known as a lime sower.

The axle is represented by 2 and in this case it passes through the hopper and is provided with a series of agitators, one only of which, represented by 3, is shown in the drawings. The end of the hopper is provided with a bearing box 4 within which is journaled a sleeve 5 fitted to the squared portion 2ª of the axle; the bearing box 4 being provided with an oil inlet 6 to provide lubricant to the bearing. A washer 7 fitted against a packing 9 seated in a recess in the end of the sleeve 5 is arranged between the end of said sleeve and the agitator 3 so as to exclude the fertilizer in the hopper. The outer end of the bearing sleeve 5 is enlarged as indicated at 5ª and this enlarged portion is provided with two diametrically-opposite recesses 10, which extend to the outer end of said enlarged portion.

The hub 11 of the driving wheel is formed with an inwardly-projecting extension 12, the extension and hub proper being rotatably mounted upon the rounded portion 2 of the axle; the hub extension being projected into the enlarged portion 5ª of the sleeve. A collar 13 and cotter pin 14 hold the hub in position on the axle and the extended portion 12 of the hub serves to maintain the sleeve 5 in its proper position within the bearing box 4, a washer 15 being preferably inserted between the end of the extension and the shoulder formed by the enlarged portion of the sleeve.

Mounted upon the enlarged portion 5ª of the bearing sleeve is a clutch member 16, arranged to be shifted back and forth by a lever 17 pivotally connected to the hopper and having a bifurcated portion 17ª fitted into the groove 16ª of the shiftable clutch member in the usual way. The interior of the shiftable clutch member has two diametrically-opposite projections 18 fitted in the recesses 10 of the sleeve 5, so as to form a driving connection between the two parts. The end of the hub has two diametrically-opposite lateral projections 19 so that when the clutch member 16 is shifted to engaging position, its projections 18 will be brought in the path of the projections 19 and thus form a driving connection between the hub of the driving wheel and the axle, through the medium of the shiftable clutch member 16 and the bearing sleeve 5.

It will be seen that by the construction described, the parts may be easily and readily dis-assembled by simply removing the collar 13. Further, the construction provides a long bearing for the hub of the driving member and at the same time brings the driving and driven members in close contact with each other so that a minimum shifting of the shiftable member is required, and at the same time, by having the extended portion formed on the hub of the driving member with the enlarged portion of the sleeve 5 projecting over this extended portion of the hub with the clutch faces located on the hub proper, the end of the extended portion may be utilized to take the end thrust of the shaft and hold the sleeve 5 in position. It will also be seen that when the shiftable clutch member is shifted to connect the driving and driven members, the space between the two members will be completely covered so as to prevent the entrance of mud or other foreign substances at this point.

Having thus described my invention, I claim:—

1. In a clutch, a shaft, a driving member rotatably mounted on said shaft, a driven member rotatably connected with said shaft and held from longitudinal movement relative thereto, a shiftable clutch member slidably mounted on said driven member and rotatably connected therewith, and engaging parts on said driving member and shiftable member adapted to form a driving connection between the same.

2. In a clutch, a shaft, a driving member rotatably mounted thereon, said driving member having an extended hub, a driven member rotatably connected with said shaft and having an enlarged portion projecting over said hub extension, a shiftable clutch member slidably mounted on the enlarged portion of said driven member, and engaging parts on said driving member and shiftable member to form a driving connection between the same.

3. In a clutch, a shaft, a driving member rotatably mounted on said shaft, said driving member having a hub extension, a driven member rotatably connected with said shaft and having an enlarged portion projecting over said hub extension, said enlarged portion having open-ended recesses, a shiftable clutch member slidably mounted on said enlarged portion, projections on said shiftable member extending into said recesses to form a driving connection between said shiftable and driven members, and projections extending from said driving member adapted to engage the projections of said shiftable member to form a driving connection between the same.

4. In a clutch, a shaft, a driving member rotatably mounted on said shaft, a driven member having a squared aperture fitted to a squared portion of said shaft, said driven member having an enlarged portion on one end thereof so as to form an interior shoulder, a hub extension projecting from said driving member into said enlarged portion in proximity to said shoulder, a shiftable clutch member slidably mounted on said enlarged portion, interior projections on said shiftable member and open-ended recesses in said enlarged portion to receive said projections, and projections on said driving member about said hub extension adapted to engage the projections of said shiftable member.

In testimony whereof, I have hereunto set my hand this 19th day of February, 1914.

HENRY N. FAAS.

Witnesses:
P. A. LEWIS,
CHAS. I. WELCH.

---

Copies of this patent may be obtained for five cents each, by addressing the "Commissioner of Patents, Washington, D. C."